(12) United States Patent
Gray

(10) Patent No.: US 7,783,313 B2
(45) Date of Patent: Aug. 24, 2010

(54) SYSTEM AND ARCHITECTURE FOR THE HANDLING OF SHARED AND PERSONAL PREFERENCES IN CALL PROCESSING AND PRESENCE FOR IP TELEPHONY AND COLLABORATIVE APPLICATIONS

(75) Inventor: Thomas A. Gray, Fort-Coulonge (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1037 days.

(21) Appl. No.: 11/504,868

(22) Filed: Aug. 16, 2006

(65) Prior Publication Data

US 2007/0043845 A1 Feb. 22, 2007

(30) Foreign Application Priority Data

Aug. 16, 2005 (EP) .................................. 05107535

(51) Int. Cl.
*H04Q 7/20* (2006.01)
(52) U.S. Cl. ...................... 455/514; 455/41.1; 455/41.2; 455/456.1; 455/414.1; 455/414.2; 340/539.1; 340/539.15; 340/539.13; 340/539.16; 709/202; 709/203; 709/218; 709/219
(58) Field of Classification Search ....... 455/41.1–41.3, 455/456.1–457, 514, 509, 500, 517, 404.1–404.2, 455/414.1–414.4, 412.1, 412.2, 550.1, 426.1, 455/426.2, 435.1, 466; 340/539.1, 539.15, 340/539.13, 539.16; 709/202, 203, 218, 709/219
See application file for complete search history.

(56) References Cited

U.S. PATENT DOCUMENTS

| 7,246,746 B2 * | 7/2007 | McNamara et al. | ......... 235/385 |
| 2004/0150520 A1 * | 8/2004 | Barrie | .................... 340/539.13 |
| 2007/0036318 A1 * | 2/2007 | Gits et al. | .............. 379/202.01 |

FOREIGN PATENT DOCUMENTS

| WO | WO 01/65821 A2 | 9/2001 |
| WO | WO 01/65821 A3 | 9/2001 |

OTHER PUBLICATIONS

European Search Report of Application No. EP 05 10 7535.
Reiff-Marganiec, Stephan, Turner, Kenneth J. "Feature Interaction in Policies." Department of Computing Science and Mathematics, University of Stirling, Sitrling FK9 4LA, United Kingdom, Jan. 13, 2004.
Shacham R., Schulzrinne, H., Kellerer, W., Thakolsri, S. "An Architecture for Location-based Service Mobility Using the SIP Event Model." Second International Conference on Mobile Systems, Applications and Services, Jun. 6, 2004, XP002351429, Boston, MA.

(Continued)

*Primary Examiner*—Keith T Ferguson

(57) ABSTRACT

A system for resolving conflicts between personal and shared space policies, comprising a location manager for monitoring location of users, each of the users being represented by a user agent for receiving session requests in accordance with user specified personal policies, a common proxy for receiving location data for the users from the location manager and in response creating a list of users at each location, and a space proxy associated with an owner of each location for enforcing space policies specified by the owner such that upon receipt of a session request with a user specified personal policy that conflicts with one of the space policies then rejecting the session request.

22 Claims, 1 Drawing Sheet

OTHER PUBLICATIONS

Reiff-Marganiec, Stephan. "Policies: Giving Users Control over Calls." International Seminar on Objects, Agents and Features, (Feb. 16-21, 2003), XP002351939, Schloss, Dagstuhl, Germany.

Blair, Lynne, Turner, Kenneth J. "Handling Policy Conflicts in Call Control." 8th International Conference on Feature Interactions in Telecommunications and Software Systems. (Jun. 28-30, 2005), XP002351874, Leicester, UK.

Amer, Magdi, Karmouch, Ahmed, Gray, Tom, Mankovskii, Serge. "Policies for Feature Interaction Resolution." Managing Q0S in Multimedia Networks and Services. IEEE/IFIP TC-6-WG6.4 & WG6.6. International Conference on Management of Multimedia Networks and Services, Sep. 25, 2000, pp. 207-223, XP001011516.

U.S. Appl. No. 11/471,742, filed Jun. 21, 2006, Gray, et al.
U.S. Appl. No. 10/631,834, filed Aug. 1, 2003, Gray, et al.
U.S. Appl. No. 10/631,853, filed Aug. 1, 2003, Gray, et al.
U.S. Appl. No. 10/631,811, filed Aug. 1, 2003, Gray.
U.S. Appl. No. 10/631,747, filed Aug. 1, 2003, Gray, et al.

M. Handley et al. "RFC 2543 -SIP: Session Initiation Protocol" The Internet Society, Mar. 1999.

S. Reiff-Marganiec et al. "Feature Interaction in Policies" (Elsevier Preprint) Jan. 13, 2004.

* cited by examiner

SYSTEM AND ARCHITECTURE FOR THE HANDLING OF SHARED AND PERSONAL PREFERENCES IN CALL PROCESSING AND PRESENCE FOR IP TELEPHONY AND COLLABORATIVE APPLICATIONS

BACKGROUND OF THE INVENTION

1. Field of the Invention

The present invention is directed to enterprise systems, and more particularly to a method and apparatus for handling shared and personal preferences in a presence-enabled communication system.

2. Description of the Related Art

An important trend in communications technology is the ability of a user to impose personal preferences on the operation and use of personal communications devices, such as VoIP phones, cellular telephones, PDA's etc. For example, SIP, H.323 and other VoIP protocols have been developed to facilitate user establishment and control of personal features on their personal devices. These protocols have been designed within the bounds of the traditional 'end-to-end' communication model. However these assumptions have serious limitations when they are applied to enterprise communications. In such communications, users leverage system resources for collaboration to accomplish enterprise goals, and will often use a mixture of shared and personal devices, as discussed in greater detail below.

A second important trend in communications technology is the use of applications over the Internet so as to permit people to collaborate over large distances as if they were in the same place. With VoIP, IM, chat sessions and other collaborative systems, it is possible to create virtual collaboration sessions that can span large distances. For example, industry analysts and academics refer to the 'death of distance' when discussing Internet applications applied to the operation of companies and their supply chains. In discussing such emerging applications, users are envisaged as being equipped with personal devices that enable them to negotiate sessions with others no matter where they are in the world. It is anticipated that users at various end points will be able to define and operate applications without any intervening control in the network With this capability, the Internet can create virtual proximity among the distributed employees of a company. However, this communication model omits an essential element for enterprise success. Most people still work in real proximity to each other. People still work in offices and meet with their colleagues in meeting rooms, hallways etc. They interact and build applications by use of both personal and shared resources. Indeed, much research has found that these informal and ad hoc interactions are essential for enterprise success, and that most information transfer is effected and decisions made through these mechanisms.

Contrary to the afore-noted expectations of virtual applications, users most commonly collaborate in real space, rather than virtual space, where the intervening network offers no constraints on user application and behavior. Users operating in real space do not have absolute control of the space in which they and their applications operate. They share spaces and the resources that are contained within them. There are norms and expectations on applications behavior and resource sharing within these real spaces. Importantly, and not accounted for in 'death of distance' discussions prevalent in the prior art, these real spaces have 'owners' who expect to be able to manage and control the interactions in the areas under their purview.

For example, consider a private office in which the occupant (referred to herein as the "owner") can meet with his/her colleagues and share information. The owner of an office space may reasonably expect to be able to direct the types of interactions that will go on within that space. Visitors to the office may be expected to bring their personal devices such as PDAs, wireless telephones, and lap top computers with them. In addition, the office may have resources that can be used to facilitate collaboration. For example, there may be screens on which presentations can be viewed, printers etc. The office owner will normally wish to make these available to his/her guests and colleagues in order to facilitate collaboration on activities of interest to the owner. However, it is also expected that the owner will be desirous of controlling access to these devices so as to efficiently organize his/her own activities that are focused in the owner's office space.

Even though the space owner has specific rights to the resources within his/her space, visitors will still be able to share these resources for enterprise purposes. For example, a visitor may be automatically registered by a location-enabled enterprise communication system as being present within an office so that calls for the visitor may automatically be forwarded to the owner's office telephone. Clearly, the forwarding of calls to the owner's office telephone while visiting (or to a meeting room telephone while participating in a meeting) must be done within strict expectations. The same can be said for the use of personal devices such as cell phones, PDAs etc. to make and receive calls. It would be outside of the expectations imposed by societal norms to use these devices for purposes that are not concerned with the current communal activity on which all parties are collaborating. Failure to observe these norms can lead to concerns that work against efficient collaboration.

The foregoing example illustrates the tension that can exist between the enforcement of multiple user preferences for the control of shared services or devices within an organization. A visitor can receive services within someone else's environment. However according to conventional norms, his or her use of services must be compatible with the objectives of others with whom he or she is collaborating, and specifically must be compatible with the objectives of the space owner.

The inventor has recognized that, as enterprise systems evolve, users will simultaneously have access to and communicate via their own personal devices (e.g. VoIP phone, cell phone, PDA, laptop computer, etc.) as well as shared devices (a conference room phone, printer, interactive wall screen, etc.) Thus, a user's 'presence' (the means by which the user may be contacted) will contain elements of each. As discussed above, emerging communication protocols permit a user to express his/her preferences for the operation of the user's personal devices (e.g. a user's personal call processing may be programmed with the user's policies and preferences). However these preferences must operate in compliance with the expectations and preferences of others in order to ensure efficient collaboration.

SUMMARY OF THE INVENTION

Therefore, it is an aspect of an object of the invention to provide a system by which the preferences of a space owner and a collaborator may be managed to control personal interactions.

It is another aspect of an object of the invention to provide a method by which the conflicts between personal and space owner or collaborator preferences may be resolved.

It is further aspect of an object of the invention to use the foregoing in a communication system providing both call processing and presence applications. In such a system, it is desirable that the user's availability does not solely depend on his/her own preferences but also on those of others with whom he/she is currently collaborating.

Therefore, according to an aspect of the present invention there is provided a method and apparatus for resolving conflict between personal and shared priorities for applications and resources in enterprise collaborative systems. According to a preferred embodiment, capabilities are added to SIP in order to allow the efficient interworking of personal and ad hoc applications that enable face to face interactions to take place in real space, and which follow the conventions for real space. More specifically, the SIP architecture is extended by creating a system of room proxies that allow the local space owner to enforce his or her preferences on visitor calls and other sessions.

The above aspects can be attained by:

A system for resolving conflicts between personal and shared space policies, comprising a location manager for monitoring location of users, each of the users being represented by a user agent for receiving session requests in accordance with user specified personal policies, a common proxy for receiving location data for the users from the location manager and in response creating a list of users at each location, and a space proxy associated with an owner of each location for receiving the list and enforcing space policies specified by the owner on the users at the location such that upon receipt of a session request with a user specified personal policy that conflicts with one of the space policies then rejecting the session request.

A method of resolving conflicts between personal and shared space policies, comprising monitoring the location of users, each of the users being represented by a user agent for receiving session requests in accordance with user specified personal policies, receiving location data for the users and in response creating a list of users at each location, and receiving the list and enforcing space policies specified by the owner on the users at the location such that upon receipt of a session request with a user specified personal policy that conflicts with one of the space policies then rejecting the session request.

A system for enforcing policies of a space owner in creating collaborative communication sessions with an area under control of the space owner, comprising a location manager for monitoring location of users, each of the users being represented by a user agent for receiving session requests in accordance with user specified personal policies, a common proxy for receiving location data for the users from the location manager and in response creating a list of users at each location, and a space proxy associated with the space owner of each location for receiving the list and enforcing space policies specified by the owner on the users at the location.

These together with other aspects and advantages which will be subsequently apparent, reside in the details of construction and operation as more fully hereinafter described and claimed, reference being had to the accompanying drawing forming a part hereof.

DETAILED DESCRIPTION OF THE PREFERRED EMBODIMENTS

Figure 1:
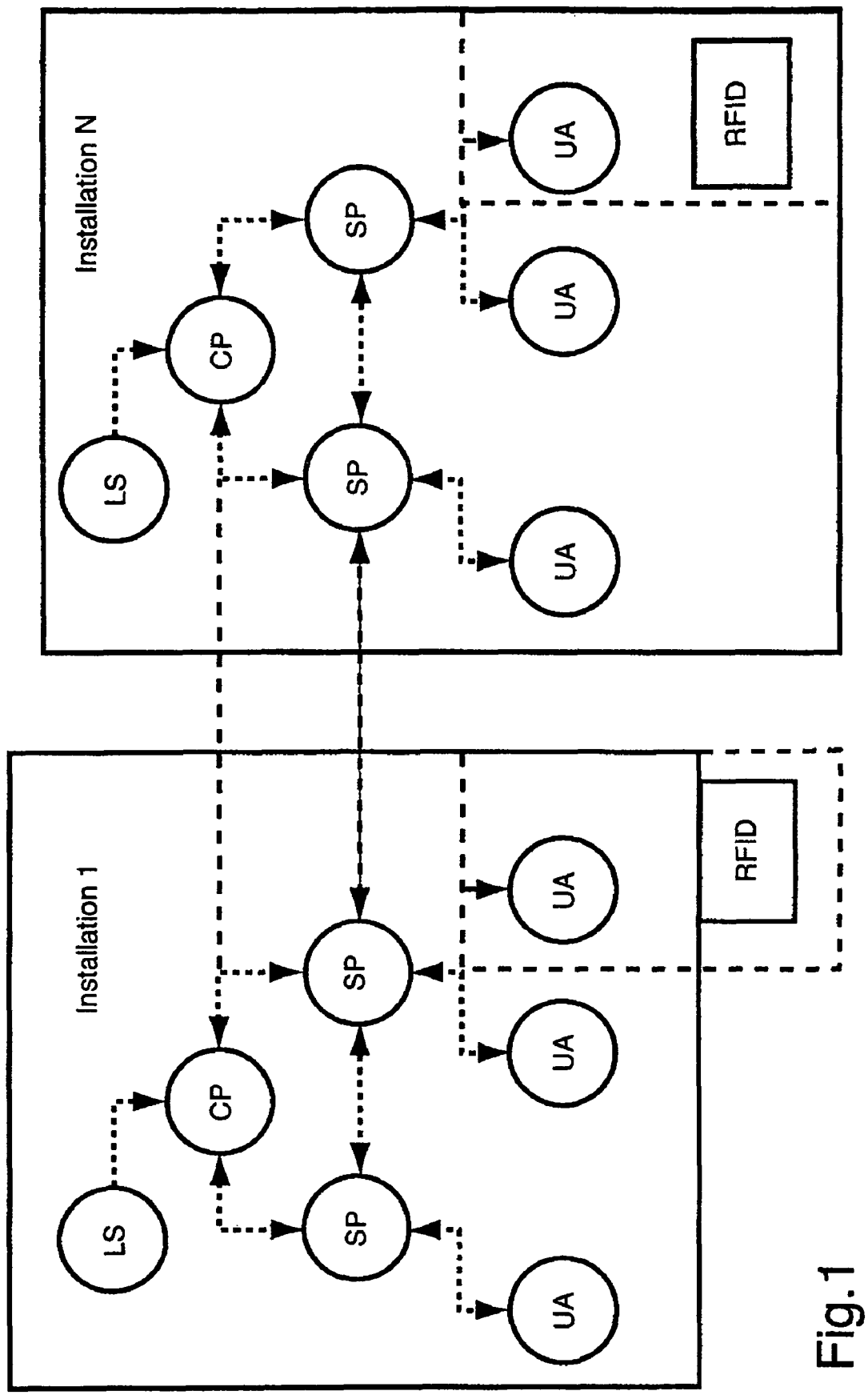
FIG. 1 is a block diagram of a system for handling shared and personal preferences in a presence-enabled communication system, according to the present invention.

As discussed above, the preferred embodiment of the present invention is implemented as an extension to SIP (RFC 2543—SIP: Session Initiation Protocol, published by the The Internet Society (1999)), because SIP is the current de facto standard for IP telephony. However a person of ordinary skill in the art will appreciate that the embodiment set forth herein could also be structured with H.323 or other known protocols.

Turning to FIG. 1, a system of components is set forth for handling shared and personal preferences in a presence-enabled communication system established over an enterprise comprising multiple installations (Installation 1 . . . Installation N), which may, for example, comprise individual buildings that are co-located on a campus, buildings located in different cities and connected via a WAN, or any defined area.

Each installation includes a Location Server (LS) for identifying users' locations within the installation (e.g. building) being monitored. Numerous technologies are known in the art for implementing such Location Servers (LS), such as RFID tags associated with each user (as represented by a User Agent (UA) in FIG. 1) and multiple RFID receivers implementing triangulation algorithms for locating the user, ultrasonic receivers (such as the MCS410CA "Cricket Mote" location-aware MICA2 Processor/Radio module, available from Crossbow Technology) or manual registration of location directly by the user on the Location Server (LS).

Each LS is configured to identify and communicate locations using semantics that are meaningful to users (e.g. identifying locations by offices and their owners, hallways, cafeterias, etc.). The LS supplies a Common Proxy (CP) with the location of all monitored users. The CP then creates lists of users who are co-located within the same monitored area and transmits these lists to the responsible Space Proxies (SP).

One Common Proxy (CP) is provided per installation. It subsumes all of the well-known functionality of a SIP proxy, including functionality to fulfill the personal preferences and polices of individual users. For example, on incoming calls the CP decides on feature handling and the resolution of caller preferences with called-party policies. The CP of the present invention provides the additional functionality of transmitting the aforementioned lists of co-located users to the Space Proxies (SPs) at whose monitored locations individual users are located.

A space proxy (SP) is provided for each monitored location within an installation. The SP also functions as a SIP proxy with the major exception that the policies and preferences enforced by it are not that of the called party but of the space owner and other collaborators in that space. The SP enforces the norms necessary for collaboration in real space.

As people move around the Installation, their locations are monitored by the Location Server (LS) using any of the well-known methods discussed above (e.g. triangulation on RFID badges, combined ultrasonic and RF triangulation or direct location registration by the user). These locations are transmitted by the LS to the Common Proxy (CP), which uses the location data in a number of ways. Firstly it performs an automatic registration service for registering a located user on all shared resources (i.e., equipment) within the user's current location. Secondly, after registration of the user on the shared resources and enforcing the user's declared call handling policies (and incoming caller preferences), the CP forwards incoming session requests to the Space Proxy (SP) that is assigned for the specific area.

The policy handler portion of the SP is responsible for enforcing the policies specified by the space owner for his/her location. Session requests are forwarded to the user agent (UA) associated with the user (for controlling a telephone, PDA, etc., which may be a personal or shared device) only if such requests are compatible with the policies specified by the space owner. If an incompatibility is detected, the SP rejects the session request. This rejection propagates back through the chain of proxies that handled the session request in the normal manner specified by the SIP protocol.

Thus, any session requests that terminate on a user device (shared or personal) are compatible both with the user's own declared policies and those of the space owner and by extension also the expectations of those with whom he/she is collaborating.

In terms of technical implementation, any of a number of policy handlers may be used to implement the Common Proxy (CP) and Space Proxy (SP) of the present invention, such as the policy handlers set forth in U.S. patent application Ser. No. 11/471,742 entitled Processing by Use of Synchronized Tuple Spaces and Assertions (Gray et al); U.S. patent application Ser. No. 10/631,834 entitled Context Aware Call Handling System (Gray et al); U.S. patent application Ser. No. 10/631,853 entitled Personalized and Customizable Feature Execution and Specification System for Application in IP Telephony and elsewhere with Operational Semantics and Implementation with Deontic Task Tree (Gray et al); U.S. patent application Ser. No. 10/631,811 entitled Architecture and Implementation for Context Aware Call Processing with Local Feature Definition (Gray) the contents of all of which are incorporated herein by reference, or the policy management system set forth in Feature Interaction in Policies, Stephan Reiff-Manganiec and Kenneth J. Turner, Department of Computing Science and Mathematics, University of Stirling, Elsevier Preprint, January 2004.

U.S. patent application Ser. No. 10/631,747 entitled Generation of Availability Indicators from Call Control Policies for Presence Enabled Telephony Systems, the contents of which is incorporated herein by reference, describes a system whereby call-processing policies are used to determine a user's availability. In essence, application Ser. No. 10/631,747 describes a system which, in response to a call attempt made to a user, provides an indication of user availability based on whether or not the user's call processing policies indicate that the call would or would not have been put through to the user. These indications may be used to drive availability indicators for buddy lists and other applications.

According to the present invention the space owner's policies may be added to the user personal policies for the purpose of deciding whether or not a call should be put through to the user in another owner's space. Consequently, indications of user availability may be generated that are cognizant not only of the user's personal policies but of the space owner's policies as well. A person of ordinary skill in the art, familiar with the subject matter of U.S. patent application Ser. No. 10/631,747 will readily appreciate that the principles of the present invention may be used to create more accurate availability indicators for buddy lists and other applications.

The preferred embodiment of the present invention has been described with respect to a distributed system. However, the invention may also operate in a centralized manner (e.g. using tuple space architectures) such as those described in U.S. patent application Ser. Nos. 11/471,742; 10/631,834 and 10/631,811, referred to above.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system for resolving conflicts between personal and shared space policies, comprising:
   a location manager for monitoring location of users, each of said users being represented by a user agent for receiving session requests in accordance with user specified personal policies;
   a common proxy for receiving location data for said users from said location manager and in response creating a list of users at each location; and
   a space proxy associated with an owner of each said location for receiving said list and enforcing space policies specified by said owner on said users at said location such that upon receipt of a session request with a user specified personal policy that conflicts with one of said space policies then rejecting said session request.

2. The system of claim 1, wherein said location manager monitors the location of said users via triangulation on RFID badges carried by said users.

3. The system of claim 1, wherein said location manager monitors the location of said users via ultrasonic triangulation.

4. The system of claim 1, wherein said location manager monitors the location of said users via direct location registration by individual ones of said users.

5. The system of claim 1, wherein said common proxy automatically registers a located user on all shared resources within the location of said user and forwards said session requests to said space proxy while enforcing said user specified personal policies.

6. The system of claim 5, wherein said shared resources include at least one of a desk phone, cell phone, PDA, white board and computer.

7. The system of claim 1, wherein each said common proxy and space proxy subsumes all functionality of a SIP proxy.

8. The system of claim 1, wherein said space proxy generates an indication of user availability based on said user specified personal policy and said one of said space policies.

9. A method of resolving conflicts between personal and shared space policies, comprising:
   monitoring location of users, each of said users being represented by a user agent for receiving session requests in accordance with user specified personal policies;
   receiving location data for said users and in response creating a list of users at each location; and
   receiving said list and enforcing space policies specified by said owner on said users at said location such that upon receipt of a session request with a user specified personal policy that conflicts with one of said space policies then rejecting said session request.

10. The method of claim 9, wherein said monitoring of location of said users comprises triangulation on RFID badges carried by said users.

11. The method of claim 9, wherein said monitoring of location of said users comprises ultrasonic triangulation.

12. The method of claim 9, wherein said monitoring of location of said users comprises direct location registration by individual ones of said users.

13. The method of claim 9, further comprising automatically registering a located user on all shared resources within the location of said user and enforcing said user specified personal policies.

14. The method of claim 9, further comprising generating an indication of user availability based on said user specified personal policy and said one of said space policies.

15. A system for enforcing policies of a space owner in creating collaborative communication sessions with an area under control of the space owner, comprising:
- a location manager for monitoring location of users, each of said users being represented by a user agent for receiving session requests in accordance with user specified personal policies;
- a common proxy for receiving location data for said users from said location manager and in response creating a list of users at each location; and
- a space proxy associated with the space owner of each said location for receiving said list and enforcing space policies specified by said owner on said users at said location.

16. The system of claim 15, wherein said location manager monitors the location of said users via triangulation on RFID badges carried by said users.

17. The system of claim 15, wherein said location manager monitors the location of said users via ultrasonic triangulation.

18. The system of claim 15, wherein said location manager monitors the location of said users via direct location registration by individual ones of said users.

19. The system of claim 15, wherein said common proxy automatically registers a located user on all shared resources within the location of said user and forwards said session requests to said space proxy while enforcing said user specified personal policies.

20. The system of claim 19, wherein said shared resources include at least one of a desk phone, cell phone, PDA, white board and computer.

21. The system of claim 15, wherein each said common proxy and space proxy subsumes all functionality of a SIP proxy.

22. The system of claim 15, wherein said space proxy generates an indication of user availability based on said user specified personal policy and said space policies.

* * * * *